UNITED STATES PATENT OFFICE.

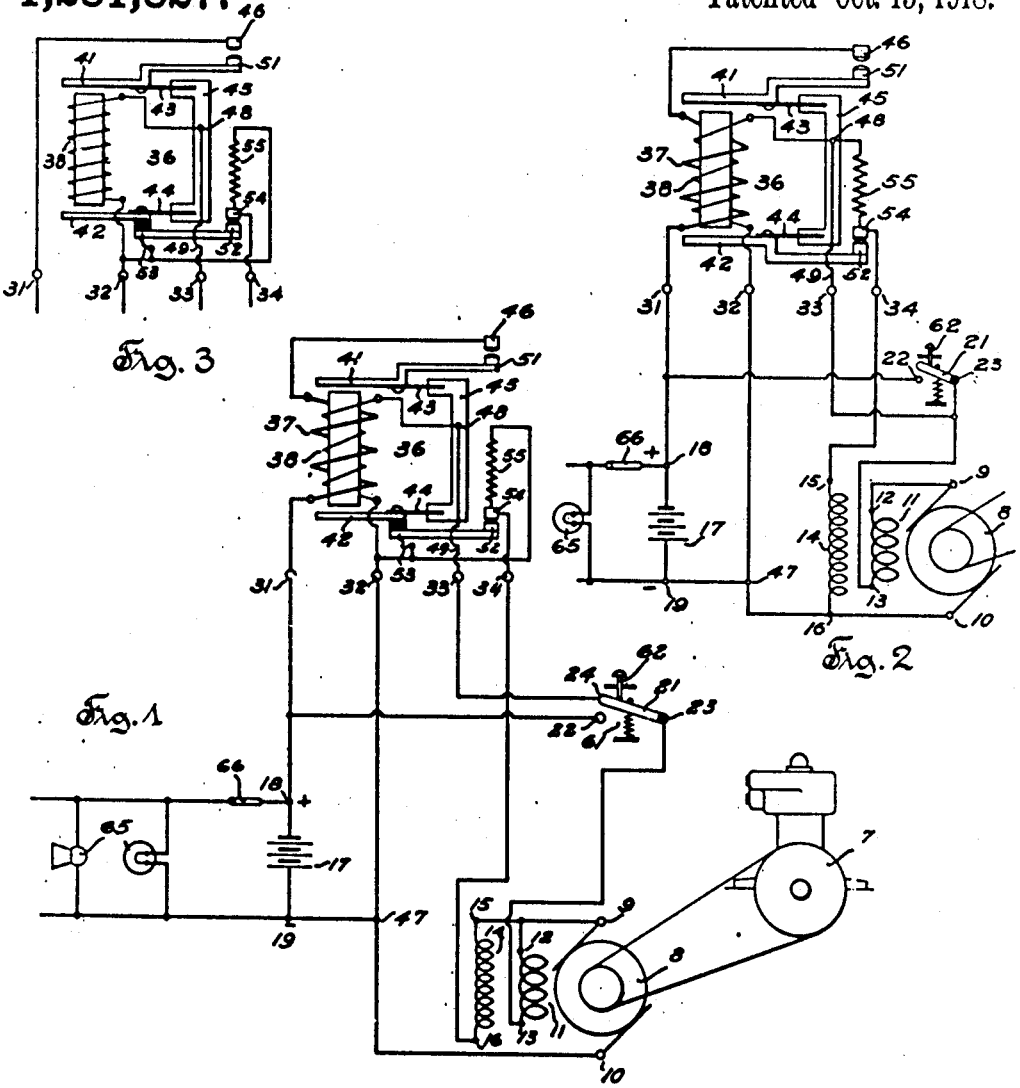

LEO A. PHILLIPS, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

ENGINE STARTING AND LIGHTING SYSTEM.

1,281,827.

Specification of Letters Patent.

Patented Oct. 15, 1918.

Application filed August 5, 1914. Serial No. 855,346.

*To all whom it may concern:*

Be it known that I, LEO A. PHILLIPS, a citizen of the United States, residing at Milwaukee, in the county of Milwaukee and State of Wisconsin, have invented a certain new and useful Improvement in Engine Starting and Lighting Systems, of which the following is a specification.

This invention relates in general to power distributing systems, and has particular relation to such systems as embody an engine, a storage battery and a dynamo-electric machine, capable of operation, as a motor, to start the engine, and, as a generator, to furnish energy for charging the battery and for other translating devices.

In such a system, especially when used on an automobile, it is desirable that the dynamo-electric machine be of sufficient size to start the engine under all normal conditions, and also under most abnormal conditions, in a comparatively short space of time; and, further, that the machine be of such size that the normal voltage developed be only slightly in excess of the battery voltage and of such a value that the lamps and other accessory apparatus can be safely operated across either the machine terminals or the battery terminals, when the latter are connected for full voltage. A single machine, of sufficient size for all starting purposes, is ordinarily more than capable, when operating at a normal rate, to fully charge the battery at an efficient rate and to supply accessory translating devices, such as lamps, etc., with the result that there is danger that the battery will be charged at an excessive rate and that the accessory apparatus will be operated at an excessive voltage, causing deterioration and, possibly, burning out of the battery and other apparatus. Hence, it is quite desirable that such regulating means be provided as will insure the charging of the battery only at an efficient charging rate, and the disconnection of the battery from the dynamo-electric machine when the machine is not so operating as to develop a voltage sufficient for charging purposes, and will not interfere with the operation of the dynamo-electric machine, as a motor, for engine starting purposes.

It is an object of this invention to provide an improved system, wherein a dynamo-electric machine, supplied by a storage battery, is used for starting an engine, and, when driven by the engine, is used for charging the battery; and wherein controlling devices are provided for insuring the charging of the battery at a predetermined rate and at any speed of operation of the machine above a certain predetermined value, along with the cutting out of the battery when the speed of the machine is below the predetermined value, and for further insuring the operation of said machine as a motor to start the engine without subjecting the battery controlling means to damage arising from the comparatively heavy currents required in the engine starting operation.

It is a further object of this invention to provide a system of this character wherein the battery is of such size that the full battery voltage can be used efficiently for the lamps and other accessory apparatus and also for effectively operating the dynamo-electric machine as a motor.

These and other objects are attained by this invention, the various novel features of which will appear from the description and drawings, disclosing one embodiment of such invention, and will be particularly pointed out in the claims.

In the accompanying drawings:

Figure 1 is a diagrammatic view of a system embodying this invention.

Fig. 2 is a diagrammatic view of a modification of the system shown in Fig. 1.

Fig. 3 is a diagrammatic view of a modification of a portion of the system shown in Fig. 1.

The embodiment of this invention shown in Fig. 1 of the accompanying drawings and comprising several features which are conducive to refined operation, will be first described. In this figure, an internal combustion engine 7 is connected by a chain, belt, or other suitable means, to a dynamo-electric machine 8, having armature terminals 9, 10. A series winding 11 having terminals 12 and 13, the terminal 12 being connected to armature terminal 9, and a shunt winding 14 having terminals 15 and 16, the terminal 15 being connected to armature terminal 9, may constitute the field excitation elements of the machine. A battery 17, having terminals 18, 19, is connected to the armature terminals of the machine 8 through the switch 21, when the same is in such position as to connect switch terminals 22 and 23, switch terminal 22 being connected to battery terminal 18, and switch terminal 23 being connected to armature terminal 19, through series field 11. The terminal 19 of the battery is connected directly to armature terminal 10. It will be obvious that, with the switch 21 in the position described, and with the other terminal 16 of the field winding 14 in electrical connection with the armature terminal 10, it will be possible to operate the machine 8 as a compound wound motor, supplied by the battery.

To insure efficient operation of the system, a regulator is connected in circuit, and is effective, only when the machine 8 is operating as a generator, to close the circuit between the battery and the generator; to cause the generator to charge the battery at an approximately constant rate and to disconnect the battery when the voltage developed by the generator is insufficient for charging purposes. The terminals of the regulator are indicated at 31, 32, 33, 34. The type of regulator shown comprises an electromagnet 36, having a comparatively coarse wire coil 37 and a fine wire coil 38. Armatures 41 and 42 are connected, through spring hinges 43 and 44, respectively, to a metal frame member 45, the spring hinges being normally effective to hold the armatures withdrawn from the respective pole faces of the magnet. One terminal of the coil 37 is connected to the terminal 31, and thence to the battery terminal 18, and the other terminal of this coil is connected to a fixed contact 46. One terminal of the coil 38 is connected to the terminal 32, and thence to the line between battery terminal 19 and armature terminal 10, being connected therewith at the point 47; and the other terminal of this coil is connected to the terminal 33, preferably through a connection with the frame 45, at 48, and the connector 49, the terminal 33 being connected with the switch terminal 24.

Secured to, or integral with, the armature 41 is a switch arm carrying a contact 51 adapted to engage with the contact 46; and secured to and insulated from the armature 42 is a switch arm carrying a contact 52. Contact 51 is electrically connected to the frame 45 through its supporting arm and armature 41 and the spring hinge 43. Contact 52 is connected, as through a flexible connection 53, secured to its supporting arm, to the terminal 32. While the resilience of the spring hinges, alone, may be depended on to return the armatures and attached contacts to normal position, it will be obvious that these spring hinges may be supplemented or replaced by other springs which may provide for variation of the force necessary to attract the armatures.

Contact 52 is adapted to coöperate with a fixed contact 54, which forms a terminal of a resistance element 55, the other terminal of said resistance element being connected to the flexible connection 53 and the terminal 32. Fixed contact 54 is also connected to terminal 34, to which terminal 16 of the field winding 14 is also connected. It will be apparent that the connection through the flexible connection 53 and switch contacts 52 and 54, when the same are in engagement, forms a short-circuit about the resistance element 55.

The fine wire, or voltage, coil 38 is of such dimensions that the same will cause the attraction of the armature 41 when the voltage across the terminals 12, 13 is sufficient to cause efficient charging of the battery, this voltage being somewhat in excess of the battery voltage. The coarse wire, or current, coil 37 is wound so as to assist the voltage coil 38 when the machine 8 is operating as a generator and charging the battery, and is of such dimensions that, when the current in the line, and consequently in this coil, reaches a certain value the combined effect of the voltage and current coils is sufficient to cause the attraction of the armature 42, thus operating the contact 52 to open the short-circuit about the resistance 55, thus including this element in the circuit of the shunt field 14.

The switch 21 is normally held in position, by a spring 61, to bridge the terminals 23 and 24, and is adapted to be operated, against the pressure of spring 61, as by a pin or bolt 62, to break the circuit between terminals 23 and 24 and to make a circuit between terminals 23 and 22.

It will be apparent that the direction of current flow through the series field winding 11, when the machine is operating as a generator, will be opposite to what it is when the machine is operating as a motor. The field windings are so connected that they assist during the operation of the machine as a motor, constituting a compound winding therefor, and are in opposition, when the machine is operating as a generator, constituting a differential winding therefor. The effect of the series winding, in the latter case, is to cut down the normal voltage and output of the machine to such a value that the battery may be charged or the accessory apparatus operated at a safe rate when the machine is running at an average or normal speed.

The connections are as shown, when the engine is dead. To start the engine, the switch 21 is operated, by depressing the actuating member 62, to cause the same to bridge the terminals 22 and 23. A circuit is then established from the positive terminal 18 of the battery, through the switch 21 and series field 11, to the armature terminal 9, through the armature, to terminal 10, and thence to the negative terminal 19 of the battery. The shunt field 14 has terminal 16 connected, through the regulator terminal 34, contacts 54 and 52, flexible connection 53, terminal 32 and connection point 47, to the armature terminal 10; and the other terminal 15 of the shunt field is connected directly to armature terminal 19. It will be apparent that the circuit of both coil 37 and coil 38 is interrupted, at this time, at the switch 21 which now bridges terminals 22 and 23. The machine 8 now starts as a compound wound motor and turns the engine over, the same operating under its own power after a few revolutions of the motor.

As soon as it is apparent that the engine is operating under its own power, the actuating member 62 may be relieved of pressure, the switch 21 then returning to normal position in which it bridges switch terminals 23 and 24. The direct circuit between the battery and the machine 8 having been broken at the switch 21, it will be apparent that the circuit between the machine and the battery will remain broken until the speed of the machine, now acting as a differential wound generator, is such as to develop a voltage of a predetermined value across the armature terminals, the magnet armature 41 being then attracted, bringing the terminals 51, 46, into engagement, thus completing a circuit between the generator and the battery. This latter circuit is from terminal 9, through series field 11 and switch 21, to terminal 33, connector 49, frame 45 at point 48, hinge 43, contacts 51 and 46, coil 37, terminal 31 to battery, and back to the other terminal 10 of the machine. The voltage coil is now connected between the point 48 on the frame 45 and the line between the machine terminal 10 and the battery terminal 19, at the point 47, the connection being made through the terminal 32. The shunt field 14 is connected from terminal 15 directly to armature terminal 9, and from terminal 16, through terminal 34, contacts 52 and 54, flexible connection 53, terminal 32, and point 47, to the armature terminal 10.

With the parts in this condition, the machine 8, acting as a generator, will supply energy to the accessory apparatus 65, and the surplus energy of the generator will be used for charging the battery. When the current in the circuit is of a predetermined value, which value should approximate the most efficient charging rate, the armature 42 is attracted, disengaging contact 52 from contact 54, and thus removing the short-circuit from the resistance element 55, and including this resistance in the circuit of the shunt field winding. This added resistance in the shunt field 14 is sufficient to reduce the voltage and also the current of the machine 8, as the resistance of the battery circuit remains practically constant during the periods of normal charging. As soon as the generator current drops below the predetermined critical value, the armature 42 drops away from the core of the magnet and contacts 52 and 54 again short-circuit the field resistance 55, allowing the current to again increase.

In the ordinary operation of the system, the contact 52 is kept in more or less continuous vibration depending on the speed at which the machine 8 is being driven. The time during which the contacts 52 and 54 are in engagement varies inversely as the speed at which the machine is operating, with the result that the effective field established is of such value as to maintain the voltage of the machine, and, as the resistance of the main circuit is substantially constant, the current in the circuit, at substantially constant values. By proper design of the regulator magnet and adjustment of the armature 42, the current value can be made to correspond with the most efficient battery charging rate.

When the speed of the generator drops to such a value that, even with the resistance 55 short-circuited, the voltage at the machine terminals is insufficient for battery charging purposes, the decreased energization of the regulator magnet permits the opening of the circuit at 46, 51, and the disconnection of the battery from the generator, this action being quickly effected, when the generator voltage drops below the battery voltage, by the deënergizing effect of a reverse current set up in the coil 37. At such time, the accessory translating devices 65 are operated from the battery as a source of supply. When the speed of the generator again rises to the proper value, switch contact 51 is again operated to close the circuit between the generator and battery.

In the modified system shown in Fig. 2, the connections of the magnet coils 37 and 38 are similar to those shown in Fig. 1. The arm bearing the switch contact 52 is, however, integral with, or electrically connected to, the armature 42, instead of being insulated therefrom, as shown in Fig. 1. The end of the resistance element 55 remote from the switch contact 54 is connected to the connection point 48 on the magnet frame 45, instead of being connected to the terminal 32, as shown in Fig. 1. The connection between the terminal 33 and the armature terminal 9 is direct and permanent, instead of being through the switch 21, when the same is in its normal or upper position, as shown in Fig. 1, the switch 21, in the system of Fig. 2, being normally inoperative, in its upper position, to complete any circuit. The shunt field terminal 15 is connected to the armature terminal 9 through the switch contacts 54 and 52, armature 42, hinge 44, frame 45, connection point 48, connector 49, terminal 33 and series field 11, instead of being directly connected to armature terminal 9, as shown in Fig. 1. The shunt field terminal 16 is directly connected to the armature terminal 10, instead of being connected thereto through switch contacts 54 and 52, connector 53, terminal 32 and connection point 47, as shown in Fig. 1.

With the parts as shown in Fig. 2, it may be considered that the engine is at rest. To start the engine, the switch 21 is operated to cause the same to bridge the terminals 22 and 23. A circuit is then established from the positive terminal 18 of the battery, through the switch 21 and series field 11, to armature terminal 9, through the armature, to terminal 10, and thence to negative terminal 19 of the battery. The shunt field 14 has terminal 16 connected directly to armature terminal 10; and the other terminal 15 is connected, through terminal 34, switch contacts 54 and 52, armature 42 hinge 44, frame 45, connection point 48, connector 49, terminal 33 and series field 11, to armature terminal 9. It will be apparent that the circuit of the coil 37 is interrupted at the contacts 46 and 51, and that the circuit of the coil 38 is completed between the terminal 32 and the connection point 48, which points are connected to opposite sides of the circuit. The machine 8 now starts as a compound wound motor and turns the engine over, the same operating under its own power after a few revolutions of the motor.

As soon as it is apparent that the engine is operating under its own power, the actuating member 62 may be relieved of pressure, the switch 21 then returning to normal position, breaking the direct circuit between the battery and the machine 8. It will be apparent that this circuit will remain broken until the speed of the machine 8, now acting as a generator, is such as to develop a voltage of a predetermined value across the armature terminals, the magnet armature 41 being then attracted, bringing the terminals 51, 46, into engagement, thus completing a circuit between the generator and the battery. This latter circuit is from terminal 9, through series field 11, switch 21, terminal 33, connector 49, frame 45 at point 48, hinge 43, contacts 51 and 46, coil 37, terminal 31 to the battery, and back to the other terminal 10 of the machine. The connections for the voltage coil 38 and the shunt field winding 14 are the same as existed during the engine starting operation.

With the parts in this latter condition, the machine 8, acting as a generator, supplies energy to the accessory apparatus 65, and the surplus energy of the generator is used for charging the battery. The parts will now operate to maintain a constant charging rate for the battery, and to cut the same out, when the voltage at the generator terminals is below a predetermined value, in like manner as described in connection with the operation of the system shown in Fig. 1.

While the system described in Fig. 2 is somewhat simpler than that of Fig. 1, nevertheless, it lacks several of the operating safeguards present in the system of Fig. 1. For instance, in the system of Fig. 1, there are present two separate breaks in the series circuit through the regulator, during the operation of the machine 8, as a motor, for engine starting purposes. This is of considerable value, for the reason that, the regulating apparatus being comparatively delicate, the contacts 46 and 51 are liable to stick, and with the parts in this condition it is possible that such a heavy current as is used during the engine starting operation may pass through the series coil of the regulator and through the contacts, as migh cause burning out or other damage to the apparatus, were it not for the additional break in this circuit at the switch 21. Again, with the connections of Fig. 1, no part of the regulating apparatus, except the contacts 54 and 52, carries current, when the machine 8 is operating as a motor; while, on the other hand, the voltage coil 38 of the system shown in Fig. 2 is active during the operation of the machine 8 as a motor. Although, in the normal and intended operation of the parts of either system, it is not intended that the voltage across the terminals of the coil 38, due to the battery, will be sufficient to cause the operation of the armature 41, nevertheless, it may be possible that, after the parts of the system of Fig. 2 are slightly out of adjustment, due to wear, there may be such operation of the armature 41 as will subject the contacts and other parts of the regulator to excessive current during the engine starting operation.

In the modification shown in Fig. 3, in which the connections are the same as in Fig. 1, except that the series coil 37 is dispensed with, the action of the regulator is wholly responsive to the voltage coil 38, the contact 46 being connected directly to the terminal 31. This modified system causes the charging of the battery at a constant voltage rather than at a constant current, as do the systems of Figs. 1 and 2. As in the system of Fig. 1, the voltage coil 38 is subjected to the battery voltage during the engine starting operation; and as this coil is of such dimensions that it will cause the operation of the armature 41 only at a higher voltage, the main circuit through the regulator remains open. When the dynamo-electric machine is acting as a generator, the voltage coil 38 causes the closing of the main circuit at the contacts 46, 51, when the generator voltage is sufficiently high for battery charging purposes. As the speed of the machine increases, the armature 42 is operated to vibrate the contact 52 more or less rapidly, depending on the speed, to thus hold the generator voltage at a practically constant value. As in the previously described systems, the armature 41 is withdrawn to open the circuit at 46, 51 when the speed of the machine 8 drops to a predetermined value.

In order to prevent the passage of a heavy charging current when the battery is practically wholly discharged, at which time the ordinary charging current can be furnished at considerably less than the normal charging voltage, due to the decreased resistance of the discharged battery, one or more turns of series winding may be provided on the magnet 36, which will act to cause the operation of the vibrator 52 at a lower generator voltage than during the normal operation of the system, causing the insertion of resistance in the field of the generator to lower its voltage, thus lowering the charging current in the same proportion. Again, these few turns of series winding will act, on a reversal of current therein when the speed of the generator is sufficiently low, to quickly deënergize the magnet 36 to the extent that the circuit will be interrupted at the contacts 46, 51.

It will be apparent that the shunt field of the dynamo-electric machine may be connected either in short shunt, as shown in the system of Fig. 1, or in long shunt, as shown in the system of Fig. 2. While the circuit of the voltage coil 38 includes the series field in the systems shown in both Figs. 1 and 2, which regulate for constant current, nevertheless, the connections might be modified so that the terminals of this coil would be connected directly across the armature terminals of this machine. This latter arrangement would probably be more advantageous in the system of Fig. 3, wherein the current and drop in the series field are not necessarily constant.

While the advantages of this invention are more apparent when a single machine, capable of acting both as a motor and a generator, and having both series and shunt fields, is used, nevertheless, in some cases, when the required operating characteristics permit it, a machine having a single shunt winding might be used without departing from the general spirit of certain features of this invention.

It will be apparent that, in accordance with this invention, an extremely simple and efficient engine starting and power supplying system is provided, in which automatically-acting unitary means are provided for causing the closure of the circuit between the dynamo-electric machine and the battery, when the voltage of the machine, acting as a generator, reaches a certain value, for insuring the efficient charging of the battery, and for cutting out the battery when the voltage at the generator terminals is insufficient for battery charging purposes, and other means, normally effective to permit the described automatic control of the machine, when acting as a generator, are operative, at times, to connect the machine directly to the battery for operation as a motor for engine starting purposes, and to render ineffective the automatically-acting controlling means.

It should be understood that it is not desired to be limited to the exact details of construction shown and described, for obvious modification will occur to a person skilled in the art.

It is claimed and desired to secure by Letters Patent:

1. In combination, an engine, a dynamo-electric machine having field windings in a plurality of elements and capable of operation as a motor or a generator connected to said engine, a storage battery, a unitary electromagnetically-actuated device effective, when said engine is operating as a generator, to connect said machine to said battery when the voltage of said machine reaches a predetermined point, to maintain constant current in the circuit of said generator and to cut out said battery when the voltage of the machine is insufficient for charging purposes, said field winding elements acting cumulatively during operation of said machine as a motor and differentially during operation of said machine as a generator, and switch means effective in one position to connect said battery and said machine independently of said electromagnetically-actuated device to cause said machine to operate as a motor for starting the engine.

2. In combination, an engine, a dynamo-electric machine having a series and a shunt field winding and capable of operation as a generator or a motor connected to said engine, a storage battery, unitary electromagnetically-actuated means responsive to the output of said machine, when operating as a generator, for regulating the output of said machine, and switch means effective in one position to cause the connection of said machine to said battery to cause said machine to operate as a motor for starting the engine, said series and shunt field windings acting cumulatively during operation of said machine as a motor and differentially during operation of said machine as a generator, and said electromagnetically actuated means being rendered ineffective when said switch is in engine starting position.

3. In combination, an engine, a dynamo-electric machine having a series and a shunt field winding and capable of operating as a motor to start said engine or as a generator driven by said engine, both said series and shunt field windings being active when said machine is operating as a motor and as a generator, a storage battery, automatic means comprising an element of magnetic material and energizing windings therefor of comparatively coarse and fine wire adapted to be connected in series and shunt, respectively, to the armature of said machine, said means being effective, when said engine is operating as a generator, to connect said battery to said machine when the speed of the machine reaches a predetermined value, to vary the resistance of said shunt field winding and thus cause a factor of the output of said generator to remain at a predetermined value while said machine is operating at speeds higher than said predetermined value, and to cut out said battery when the speed of said machine drops below said predetermined speed value, and switch means effective in one position to connect said machine to said battery for operation of said machine as a motor for engine starting purposes with the series and shunt energizing windings of said automatic means in inactive condition.

In testimony whereof the signature of the inventor is affixed hereto in the presence of two witnesses.

LEO A. PHILLIPS.

Witnesses:
J. J. KANE,
W. H. LIEBER.